Nov. 16, 1965   R. B. BOSSLER, JR   3,217,809
ROTOR BLADE PITCH CHANGING MECHANISM
FOR ROTARY WING AIRCRAFT
Filed Feb. 28, 1963   2 Sheets-Sheet 1
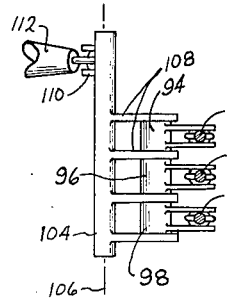
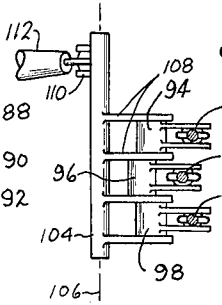
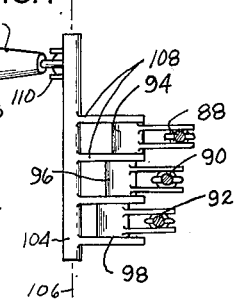
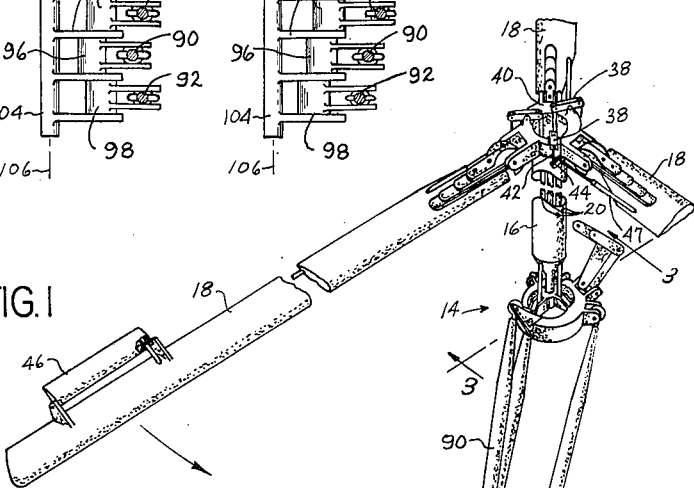
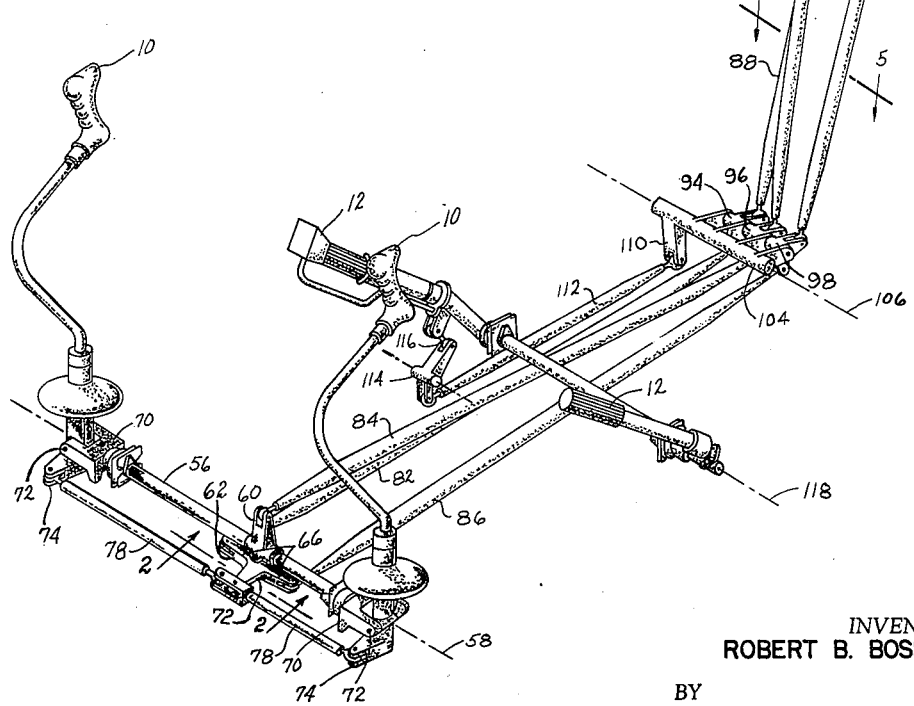
INVENTOR.
ROBERT B. BOSSLER Jr.
BY
McCormick, Paulding & Huber
ATTORNEYS

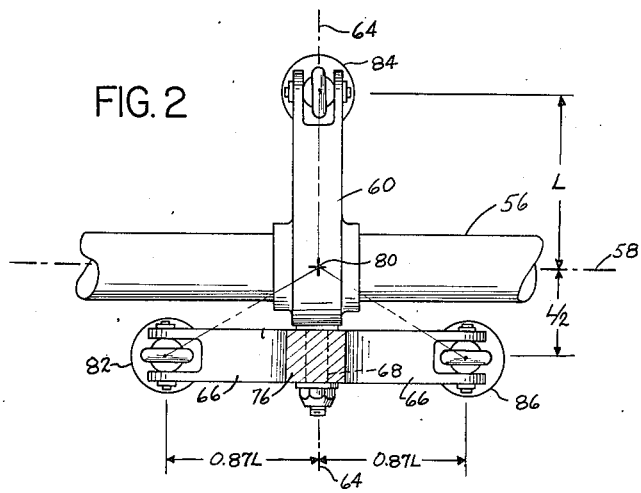
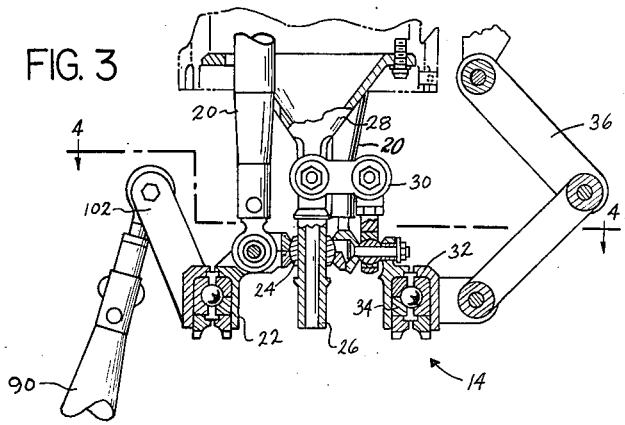
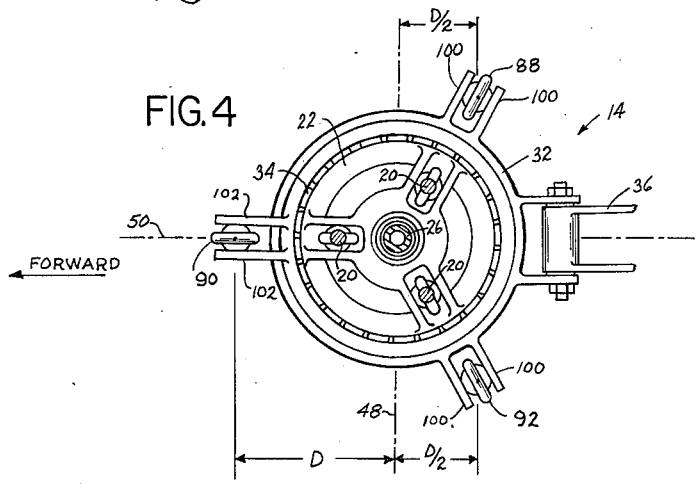

United States Patent Office 3,217,809
Patented Nov. 16, 1965

3,217,809
ROTOR BLADE PITCH CHANGING MECHANISM FOR ROTARY WING AIRCRAFT
Robert B. Bossler, Jr., Bloomfield, Conn., assignor to Kaman Aircraft Corporation, Bloomfield, Conn., a corporation of Connecticut
Filed Feb. 28, 1963, Ser. No. 261,592
11 Claims. (Cl. 170—160.25)

The present invention relates to improvements in rotary wing aircraft, such as helicopters, wherein the blades of the sustaining rotor or rotors are changeable in pitch both collectively and cyclically to propel and maneuver the aircraft, and deals more particularly with a novel control mechanism for so changing the pitch of the rotor blades.

One object of the present invention is to provide a helicopter flight control or rotor blade pitch changing system which is safer, more reliable, and easier to operate than prior designs.

It is also an object of the present invention to provide a rotor blade pitch changing mechanism wherein static forces imposed thereon, and caused by centrifugal force, feathering torque, or the like, are isolated from the control column by being reacted against fixed structure of the aircraft so that the pilot feels control forces and not static loading.

Another object of this invention is to provide a rotor blade pitch changing mechanism utilizing a relatively small number of parts and in which several of the parts may be made to be interchangeable with one another to reduce manufacturing expense.

Another object of this invention is to provide a rotor blade pitch changing mechanism of simple construction having a basic design which eliminates any cross-coupling between the cyclic and collective inputs, but which basic design may also be easily modified if desired to provide for the automatic introduction of a slight amount of lateral cyclic pitch change with changes in collective pitch to counteract changes in the translating force exerted by the tail rotor, or other anti-torque device, required to maintain directional control, and which basic design may also be easily modified if desired to provide for the automatic introduction of a slight amount of longitudinal cyclic pitch change with changes in the collective pitch to counteract changes in the drag of the rotor.

Other objects and advantages of the invention will be apparent from the following description and from the drawings forming a part hereof.

The drawings show a preferred embodiment of the invention and such embodiment will be described, but it will be understood that various changes may be made from the construction disclosed, and that the drawings and description are not to be construed as limiting the scope of the invention, the claims forming a part of this specification being relied upon for that purpose.

Of the drawings:

FIG. 1 is a perspective view of a helicopter rotor blade pitch control mechanism embodying the present invention.

FIG. 2 is an enlarged fragmentary vertical view of the forward end portion of the cyclic pitch changing linkage taken on the line 2—2 of FIG. 1.

FIG. 3 is an enlarged vertical sectional view taken on the line 3—3 of FIG. 1.

FIG. 4 is a horizontal sectional view taken on the line 4—4 of FIG. 3.

FIG. 5 is an enlarged fragmentary view taken on the line 5—5 of FIG. 1.

FIG. 6 is an enlarged fragmentary view similar to FIG. 5 but showing the bell cranks differently arranged on the stirrup crank.

FIG. 7 is an enlarged fragmentary view similar to FIG. 5 but showing still another arrangement of the bell cranks on the stirrup crank.

FIG. 1 illustrates a blade pitch changing mechanism for the main lifting rotor or rotors of a helicopter. The mechanism is shown adapted for a helicopter with a single three-bladed lifting rotor and which helicopter carries two pilots, or a pilot and a co-pilot, side by side, but the broader aspects of the invention are not necessarily limited to such a helicopter configuration, the illustrated configuration being shown by way of example only. Omitted from the figure for purposes of clarity are the foot pedals or other control devices for operating a variable pitch tail rotor or other similar directional control device, however it is to be understood that such a device, which may be of conventional construction, is involved as part of the helicopter.

The illustrated control mechanism is of a direct mechanical linkage type and consists of pilot operable control columns or sticks 10, 12 connected to an azimuth mechanism 14 through a linkage system hereinafter described in detail. The rotor includes a drive shaft 16 supported for rotation about a generally vertical axis fixed relative to the stationary structure of the helicopter, and the azimuth mechanism is located directly below the drive shaft 16 and in turn connected with pitch changing devices on the individual rotor blades 18, 18 by three vertical rods 20, 20. The azimuth mechanism, the pitch changing devices on the individual rotor blades, and the means connecting the azimuth mechanism to such pitch changing devices by themselves form no part of the present invention and may vary widely as to details of construction. In the illustrated case, however, the azimuth mechanism, as shown best in FIGS. 3 and 4, includes an inner rotating member or swashplate 22 which is mounted to a ball member 24 for tilting movement in any direction about the center point of the ball. The ball member is in turn mounted for axial sliding movement on the downwardly extending stem 26 of a funnel-shaped member 28 fixed at its upper end to the lower end of the rotor drive shaft, the stem 26 being coaxial with the rotor drive shaft axis so that the sliding movement of the ball occurs along the latter axis. A torque scissors 30 connected between the stem 26 and the swashplate 22 drives the swashplate in unison with the drive shaft. A non-rotating ring 32 surrounds the swashplate 22 and is joined thereto by an anti-friction bearing unit 34, and a torque scissors 36 connected between the ring 32 and the stationary structure of the helicopter restrains the ring against movement about the drive shaft axis.

At their lower ends the three vertical rods 20, 20 are connected by ball joints to the swashplate 22 at three points equally spaced about the axis thereof, and at their upper ends each rod is connected to the inner end of a corresponding rocklever 38 pivotally supported on the rotor hub 40. At the outer end of the rocklever is a link 42 which connects the rocklever to a horn 44 fixed to the radially inner end of a torsion rod 47 extending longitudinally through the body of the associated blade. Movement of the rocklever by the rod 20 therefore rotates the torsion rod through the link 42 and horn 44 and this rotation of the torsion rod in turn, through suitable mechanism, not shown, positions a servo-flap 46 which is carried by the blade and which aerodynamically adjusts the blade about its longitudinal or pitch changing axis.

Movement of the swashplate vertically as by sliding the ball member 24 axially on the stem 26 moves all three rods 20, 20 uniformly in the same direction and therefore collectively varies the pitches of all three blades to increase or decrease the thrust of the rotor. Tilting the swashplate in any direction from the neutral attitude shown in FIG. 3 causes the three rods to oscillate vertically, at a frequency of one cycle of oscillation for each revolution of the rotor, and therefore cyclically varies the pitches of the rotor blades, in a manner well known in the art, to vary the inclination of the thrust vector relative to the drive shaft axis. The arrangement of the vertical rods 20, 20 and of the parts of the pitch changing devices associated therewith is such that tilting the swashplate about an axis, such as shown at 48, extending transversely of the helicopter fuselage changes the cyclic pitch in a longitudinal manner. That is, tilting the swashplate about the transverse axis 48 similarly tilts the thrust vector about a transverse axis to change the forward or longitudinal component of the rotor thrust. Tilting the swashplate about a longitudinal axis, such as shown at 50, effects a lateral cyclic pitch change, or more particularly tilts the thrust vector about a longitudinal axis to change the lateral component of the thrust vector.

Turning now to the control system for varying the position of the swashplate 22 and nonrotating ring 32, and first considering the cyclic pitch control, a member 56 is provided and is supported for rotation about a transverse axis 58 fixed relative to the stationary structure of the aircraft. Fixed to the member 56 for rotation therewith is an arm 60 which extends generally vertically upwardly from the axis 58. Also carried by the member 56 is a crank 62 which is supported for rotation about an axis 64 fixed relative to the member 56 and generally parallel with the arm 60. The crank 62 is located on the opposite side of the axis 58 from the arm 60 and includes two arms 66, 66 which extend in opposite directions from the axis 64 and which are generally parallel with the axis 58. In the illustrated case the member 56 constitutes a transverse elongated shaft and the arm 60 includes an apertured portion which surrounds and is fixed to the shaft 56 and also includes a journal portion or stem 68 extending downwardly from the apertured portion, said journal portion serving to rotatably support the crank 62 and defining the axis 64. The pivotal portion 68, and therefore the axis 64, is generally aligned with the arm 60.

Pilot operable means are provided for moving the arm 60 and the crank 62 about the axis 58 and for moving the crank 62 about the axis 64. This means may take various forms, but in the illustrated case includes either one of the two cyclic control columns 10, 10 each of which at its lower end is attached to the shaft 56 by means of a fork 70 fixed to the associated end of the shaft and having two arms which straddle the lower end of the column. The arms of each fork 70 are in turn connected with the associated column by means of a longitudinally disposed pivot pin 72. The upper portion of each cyclic column is therefore movable laterally, or from side to side, as a result of pivoting movement about the axis of the associated pin 72 and is movable fore and aft as a result of pivoting movement of the shaft 56 about the axis 58. Each cyclic column 10 extends downwardly beyond the pin 72 and at its lower end includes an arm 74 which extends generally longitudinally, and in the illustrated case forwardly, from the axis 58. The crank 62 is of a generally T-shaped configuration and includes a stem 76 which extends longitudinally away from the axis 58 in the same direction as the two arms 74, 74, the stem 76 being generally perpendicular to the crank arms 66, 66. The free end of each arm 74 is connected with the free end of the stem 76 by a transverse link 78 with the result that the lateral movement of either cyclic column 10 rotates the crank 62 about its axis 64. Fore and aft movement of either cyclic column rotates the shaft 56 about its axis 58 and thereby moves the arm 60 longitudinally in one direction and the two arms 66, 66 longitudinally in the opposite direction.

Associated with the three arms 60, 66 and 66 are three linkage trains for transmitting the motion of said arms to the nonrotating ring of the azimuth assembly for the purpose of tilting said ring in response to the movement of the arms. These linkage trains may take various different forms, but preferably and as shown are connected with said nonrotating azimuth ring at three support points which are uniformly spaced about and from the center point of the ring, the linkage trains also being of substantially similar mechanical advantage. If the nonrotating ring is so supported by uniformly spaced support points, static loads applied to the azimuth assembly through the rods 20, 20, and caused by centrifugal force on the blades, feathering torque, etc., will be shared substantially equally by the three support points. Therefore, if the three linkage trains also have substantially equal mechanical advantages, the equal static loads applied to the linkage trains at the three support points will cause equal loads to be applied to the three arms 60, 66 and 66.

Assuming that equal static loads are applied to the arms 60, 66 and 66 as above described, the latter arms may be arranged relative to one another and relative to the axes 58 and 64 so that the static forces are substantially completely balanced and reacted against the stationary structure and thereby isolated from the cyclic column 10, the pilot therefore feeling only the control forces and not the static loads. Such an arrangement is shown in FIG. 2 wherein it will be noted that the point of connection between the arm 60 and its linkage train is spaced from the axis 58 by a distance equal to twice the distance $L/2$ from each point of connection between each arm 60 and its linkage train. Therefore assuming that the static forces are applied along generally longitudinally extending lines, the moments produced by the static load applied to the arm 60 and about the axis 58 will exactly balance the moments produced by the static loads applied to the arms 66, 66. Also, since the two crank arms 66, 66 are of equal length the sum of the moments about the axis 64 produced by the equal static loads on the two arms 66, 66 will be opposite and equal. The static forces applied to the arms are therefore balanced and through the shaft 56 reacted agaisnt the stationary structure of the aircraft so that no force is transmitted to the control column 10.

Also, as shown in FIG. 2, the two arms 66, 66 are of such length that the point of connection between each such arm and its associated linkage trains is displaced from the axis 64 by a distance equal to approximately $\sqrt{3}/2L$, or 0.87L. As a result of this, the ends of the three arms 60, 66 and 66 are symmetrically arranged and uniformly spaced about a center point 80 located on the axis 58. This symmetrical arrangement of the three arm ends is similar to the symmetrical arrangement of the three support points for the nonrotating ring 32 of the azimuth mechanism, and as a consequence of this and the equal mechanical advantages of the three linkage trains, movement of the cyclic control column is effective to produce purely tilting movements of the azimuth mechanism, and to thereby produce purely cyclic pitch changes, without producing an undesired axial or bodily shifting of the azimuth mechanism coupling a collective pitch change with the cyclic pitch change. This result is explained in more detail below following the description of the illustrated linkage trains and the collective pitch control elements.

The three linkage trains connecting the arms 60, 66 and 66 with the three support points of the azimuth mechanism may take various different forms. As illustrated, however, each linkage train includes one generally horizontal link and one generally vertical link connected together by means of a bell crank. Referring to FIG. 1, the three horizontal links are shown at 82, 84 and 86, the three vertical links are shown at 88, 90 and 92, and the three bell cranks are shown at 94, 96 and 98. The three horizontal links 82, 84 and 86 at their forward ends are universally connected respectively with the arms 66, 60 and 66 and at their rear ends are connected to depending arms of the corresponding bell cranks 94, 96 and 98.

The three vertical links 88, 90 and 92 at their lower ends are connected to generally horizontal arms of the bell cranks 94, 96 and 98 and at their upper ends are respectively connected with the three support points of the nonrotating ring 32 of the azimuth mechanism 14. As shown in FIG. 4, the support points for the two vertical rods 88 and 92 are provided by two pairs of similar radially outwardly extending lugs 100, 100 on the nonrotating ring and the support for the vertical rod 90 is provided by two other lugs 102 and 102, the links being positioned between the pairs of lugs and connected thereto by suitable universal connections. In the arrangement shown, the links 82, 84, 86, 88, 90 and 92 are of identical lengths and may therefore be made identical with one another so as to be interchangeable, thereby reducing the number of different parts required for the control system. To this end, it should be noted that the illustrated case shows the azimuth mechanism to be located slightly rearwardly of the bell cranks and therefore, in order to allow the forward vertical link 90 to be made of the same length as the two lateral links 88 and 92, the support lugs 102, 102 extend some distance upwardly from the nonrotating ring 32 and above the lugs 100, 100.

In order to provide for collective pitch adjustment of the blades 18, 18 as by sliding the azimuth mechanism 14 axially or bodily along the stem 26, the three bell cranks 94, 96 and 98, as shown in FIG. 1, are supported for rotation about pivot axes which are fixed relative to a stirrup crank 104, the latter being supported for rotation about a transverse axis 106 fixed relative to the stationary structure of the aircraft. The stirrup crank 104 includes four transversely spaced generally horizontal arms 108, 108 in the spaces between which are located the bell cranks 94, 96 and 98, the latter being pivotally secured to said arms by suitable pivot pins or the like. The stirrup crank 104 also includes a depending arm 110 which is connected with the collective columns 12, 12 by means of a generally horizontal link 112, a bell crank 114 and a link 116. The control columns 12, 12 are supported for generally fore and aft movement about a transverse pivot axis 118 fixed relative to the stationary structure of the aircraft. Moving either control column generally upwardly or rearwardly, as viewed in FIG. 1, rotates the bell crank 114 in a counterclockwise direction, shifts the link 112 rearwardly, and thereby rotates the stirrup crank 104 counterclockwise to raise the bell cranks 94, 96 and 98. As shown in FIGS. 1 and 5, the bell cranks 94, 96 and 98 are located equal distances from the axis 106 of the stirrup crank and therefore as a result of the movement of the stirrup crank the three bell cranks are raised by equal amounts. The three vertical links 88, 90 and 92 are therefore also raised by equal amounts with the result that the azimuth mechanism 14 is moved bodily upwardly along the stem 26. As a further result of this movement of the azimuth mechanism the pitch of the three blades 18, 18 are collectively increased as will be well understood by those skilled in the art. Moving either collective control column 12 generally forwardly, or downwardly, will have the opposite effect of moving the azimuth mechanism downwardly along the axis of the stem 26 to decrease the collective blade pitch.

Instead of the bell cranks 94, 96 and 98 being located equal distances from the axis 106 of the stirrup crank as shown in the structure of FIGS. 1 and 5, the bell cranks may be otherwise arranged in order to provide for the automatic introduction of a slight amount of cyclic pitch change to accompany a given collective pitch change. For example, if the collective pitch of the rotor blades is increased, the drag of the rotor is also increased, and tends to slow the forward speed of the aircraft. To overcome this tendency, the cyclic pitch of the rotor blades may be changed in a longitudinal manner to tilt the rotor tip path plane forwardly thereby increasing the forward component of the rotor thrust by an amount sufficient to overcome the increased drag of the rotor. This forward tilting of the rotor tip path plane may be introduced automatically by arranging the bell cranks as shown in FIG. 6 so that the bell crank 96 associated with the forward vertical link 90 is located closer to the stirrup crank axis 106 than the two bell cranks 94 and 98 associated with the two lateral vertical links 88 and 92. Therefore, when the stirrup crank is moved about the axis 106 as a result of operation of the collective columns 12, 12, the vertical link 90 is moved to a lesser extent than the two links 88 and 92. If the stirrup crank is moved in such a manner as to raise the bell cranks, the two vertical links 88 and 92 move upwardly by a distance greater than the upward movement of the link 90 with the result that the azimuth mechanism in addition to being moved bodily along the axis of the stem 26 is also tilted to a slight extent about the transverse axis 48. This tilting of the azimuth mechanism in turn changes the longitudinal cyclic pitch so as to tilt the rotor tip path plane forwardly in the manner desired.

Likewise, when the collective pitch is increased the torque exerted on the rotor is similarly increased and must, in a single lifting rotor aircraft, be counteracted by an increase in the countertorque produced by the tail rotor or other anti-torque device. Increase in the lateral thrust of the anti-torque device, however, in addition to increasing the countertorque to balance the increased torque of the rotor also creates a lateral force unbalance on the aircraft which, to prevent the aircraft from moving sideways, must be overcome by cyclically changing the pitch of the rotor blades in a lateral manner to tilt the rotor blade tip path plane laterally, thereby producing a lateral rotor thrust component sufficient to overcome the translating force of the anti-torque device. In order to automatically produce such a cyclic pitch change of the rotor blades the bell cranks may be arranged as shown in FIG. 7 wherein one of the two bell cranks 94 or 98 is located closer to the stirrup crank axis 106 than the other. For counterclockwise rotation of the main rotor, as shown in FIG. 1, and assuming the anti-torque device to be located rearwardly of the main rotor, the bell crank 94 is located further from the axis 106 than the bell crank 98. For a clockwise rotating rotor, the displacements of these bell cranks from the axis 106 are reversed. Referring to FIG. 7, if the stirrup crank 104 is moved about its axis 106 to raise the arms 108, 108 the link 88 will be moved upwardly a distance greater than that of the link 92 with the result that the azimuth mechanism 14, in addition to being moved bodily upwardly, will be tilted about its longitudinal axis 50 with the left or port side of the azimuth mechanism being lowered and the right or starboard side of the same being raised. As a result the rotor tip path plane is tilted to the port side as desired to provide a laterally directed component of thrust sufficient to overcome the change in the lateral thrust of the anti-torque device. Although not shown in the drawings, the bell cranks 94, 96 and 98 may also obviously be so arranged on the stirrup crank as to provide for both the automatic introduction of longitudinal cyclic pitch, as provided by the FIG. 6 arrangement, and for the automatic introduction of lateral cyclic pitch, as provided by the FIG. 7 arrangement.

Returning to the cyclic pitch control system, and considering its operation as effected by movement of the cyclic control columns 10, 10, assume first that either one of the cyclic control columns is moved generally forwardly from the position shown in FIG. 1. This movement of the control column moves the shaft 56 about its axis 58 and as a result moves the arm 60 forwardly and the two arms 66, 66 rearwardly. Since, as shown in FIG. 2, the arm 60 is attached to the link 84 at a point spaced from the axis 58 by a distance L equal to twice the distance $L/2$ from the axis 58 to the point of connection between the arms 66, 66 and the two associated links 82 and 86, the link 84 is moved forwardly by a distance equal to twice the rearward displacement of the two links 82 and 86. This movement of the horizontal links is transmitted through the bell cranks 94, 96 and 98 to the vertical links 88, 90 and 92, with the forward link 90 being moved downwardly by a distance equal to twice the upward movement of the two lateral links 88 and 92.

As shown in FIG. 4, the arrangement of the support points for the azimuth mechanism 14 is such that the forward support point associated with the link 90 is located from the transverse axis 48 by a distance D equal to twice the displacement D/2 of the two lateral support points, associated with the control links 88 and 92, from the axis 48. Therefore, since the forward support point is moved downward by twice the distance of the upward movement of the two lateral support points, the azimuth assembly is moved in a pure tilting motion about the transverse axis 48 without any accompanying bodily movement of the assembly along the axis of the stem 26. Accordingly, the pitch change effected by forward movement of either cyclic control column 10 is a purely cyclic pitch change with no attendent change in the collective pitch of the blades. Moving the cyclic control column rearwardly from the position shown in FIG. 1 has the opposite effect of tilting the azimuth mechanism rearwardly about the transverse axis 48 to change the longitudinal cyclic pitch of the rotor blades in such a manner as to tilt the rotor tip path plane rearwardly.

Assume now that either one of the two cyclic control columns is moved toward the port side of the aircraft or toward the viewer in FIG. 1. This causes the columns to pivot about the longitudinal pivot axes provided by the longitudinal pins 72, 72 and causes the associated arms 74, 74 to be moved toward the starboard side of the aircraft, thus shifting the links 78, 78 in the same direction and thereby rotating the T-crank 62 in the clockwise direction as viewed from above. This pivoting movement of the T-crank 62 occurs about the axis 64 which remains stationary as does the arm 60 and shaft 56. The pivoting movement of the T-crank moves the horizontal link 86 forwardly and the horizontal link 82 rearwardly by an equal amount. These motions are in turn transmitted through the bell cranks 94 and 98 to cause the vertical rod 88 to shift upwardly and the rod 92 to shift downwardly. The rod 90 remains stationary and since the rods 88 and 92 move equal extents in opposite directions the azimuth mechanism 14 is tilted about the longitudinal axis 50 to produce a corresponding lateral cyclic pitch change, with no bodily shifting of the azimuth mechanism or collective pitch change accompanying this tilting movement. Moving the cyclic control columns in the opposite direction has the opposite effect of tilting the azimuth mechanism in the opposite direction about the longitudinal axis 50 to change the direction of the lateral cyclic pitch change.

The invention claimed is:

1. In a blade pitch changing mechanism for an aircraft rotor, the combination comprising a rotor having a plurality of blades, a drive shaft for said rotor which drive shaft is rotatable about a given axis, a first arm supported for rotation about a first axis fixed relative to said drive shaft axis, a crank rotatable about a second axis arranged generally parallel to said arm and fixed relative to said arm for movement in unison therewith, said crank being located on the opposite side of said first axis from said arm and having two arms spaced from said first axis and extending in generally opposite directions from said second axis, pilot operable means connected with said first arm for selectively positioning said arm about said first axis and connected with said crank for selectively positioning said crank about said second axis, and means connected with said three arms and with said rotor for varying the pitch of the blades of said rotor in accordance with the movements of said arms.

2. In a blade pitch changing mechanism for an aircraft rotor, the combination comprising a rotor having a plurality of blades, a drive shaft for said rotor which drive shaft is rotatable about a given axis, a first arm supported for rotation about a first axis fixed relative to said drive shaft axis, a crank rotatable about a second axis arranged generally parallel to said arm and fixed relative to said arm for movement in unison therewith, said crank being located on the opposite side of said first axis from said arm and having two arms spaced from said first axis and extending in generally opposite directions from said second axis, pilot operable means connected with said first arm for selectively positioning said arm about said first axis and connected with said crank for selectively positioning said crank about said second axis, an azimuth mechanism connected with said rotor and including a nonrotatable member tiltable about a center point and movable bodily along a straight line, and three linkage trains each extending between a respective one of said three arms and a respective one of three support points on said nonrotatable azimuth member for tilting said nonrotatable member by moving said support points in response to movement of said arms.

3. The combination defined in claim 2 further characterized by said three support points on said nonrotatable azimuth member being uniformly spaced about and from said center point, and said linkage trains having such mechanical advantages and the points of connection between said three arms and said three linkage trains being so spaced from said first axis that when equal and similarly directed forces are applied to said three linkage trains at said three support points the sum of the moments about said first axis produced by said three crank arms is substantially zero.

4. The combination defined in claim 3 further characterized by the two points of connection between said crank arms and the two associated linkage trains being located equal distances from said second axis.

5. The combination as defined in claim 2 further characterized by said three support points on said nonrotatable azimuth member being uniformly spaced about and from said center point, said linkage trains having substantially equal mechanical advantages, the two points of connection between said crank arms and the two associated linkage trains being located equal distances from said second axis and equal distances from said first axis, and the point of connection between said first arm and its associated linkage train being spaced from said first axis by a distance equal to substantially twice the distance from said first axis to the point of connection between either of said two crank arms and its linkage train.

6. The combination as defined in claim 5 further characterized by the distance from said second axis to the point of connection between each crank arm and its associated linkage train being equal to approximately 0.87L, where L represents the distance from said first axis to the point of connection between said first arm and its associated linkage train, and said second axis being aligned with said first arm so that the three points at which the three arms are connected to the three linkage trains are uniformly spaced from and about a point located on said first axis.

7. In a blade pitch changing mechanism for an aircraft rotor, the combination comprising a rotor having a plurality of blades, a first arm supported for rotation about a first axis, a crank rotatable about a second axis arranged generally parallel to said arm and fixed relative to said arm for movement in unison therewith, said crank being located on the opposite side of said first axis from said arm and having two arms extending in generally opposite directions from said second axis, pilot operable means connected with said first arm for selectively positioning said arm about said first axis and connected with said crank for selectively positioning said crank about said second axis, an azimuth mechanism connected with said rotor and including a nonrotatable member tiltable about a center point and movable bodily along a straight line, three linkage trains each extending between a respective one of said three arms and a respective one of said three support points on said nonrotatable azimuth member for tilting said nonrotatable member by moving said support points in response to movement of said arms, each of said linkage trains including a bell crank having a pivot axis, a stirrup crank rotatable about a given axis and having supported thereon the three bell cranks of said three linkage trains with the pivot axis of each bell crank being fixed relative to the stirrup crank and parallel to said given axis thereof, and a pilot operable means for rotating said stirrup crank about its given axis, at least two of said bell cranks having their pivot axes spaced different distances from said given axis of said stirrup crank so as to be moved different distances in response to movement of said stirrup crank.

8. The combination as defined in claim 2 further characterized by said azimuth mechanism having said center point located on and movable along said rotor drive shaft axis, and each of said three linkage trains including a horizontal link connected with one of said three arms, a vertical link connected with said nonrotatable azimuth member, and a bell crank connected between the horizontal link and the vertical link, the six of said links being identical with one another.

9. In a blade pitch changing mechanism for an aircraft rotor, the combination comprising a rotor having an plurality of blades, a drive shaft for said rotor which drive shaft is rotatable about a given axis, a member supported for rotation about a first axis fixed relative to said drive shaft axis, a cyclic pitch control column mounted on said member for rotation about a second generally horizontal axis fixed relative to said first axis and arranged generally normal thereto, said control column including an arm having a connection point spaced from said first axis and said control column also including a portion extending generally upwardly from said second axis and adapted for manipulation by the pilot of said aircraft, a crank arm fixed to said member for rotation therewith and extending generally normally from said first axis, a T-shaped crank mounted on said member for rotation about a third axis generally aligned with said latter arm and which crank includes two arms which extend in opposite directions from said third axis generally parallel to and spaced from said first axis and a stem extending from said latter two crank arms in the same direction as said control column arm, a link connected between said connection point of said control column arm and said crank stem for rotating said crank about said third axis in response to movement of said control column about said second axis, an azimuth mechanism including a nonrotatable member tiltable in various directions about a center point, and means connecting said three crank arms respectively with three points on said nonrotatable member for tilting the latter in response to movement of said crank arms.

10. In a blade pitch changing mechanism for an aircraft rotor, the combination comprising a rotor having a plurality of blades, a drive shaft for said rotor which drive shaft is rotatable about a given axis, a first member supported for rotation about a first axis and having a first connection point thereon spaced radially from said first axis, a second member carried by said first member and rotatable relative to said first member about a second axis fixed relative to said first member, said second member being located on the opposite side of said first axis from said first connection point and having second and third connection points located on opposite sides of said second axis and spaced from said first axis, pilot operable means connected with said first member for selectively positioning said first and second members in unison about said first axis, pilot operable means connected with said second member for selectively positioning said second member about said second axis independently of movement of said first member about said first axis, an azimuth mechanism connected with said rotor and including a nonrotatable member tiltable about a center point and movable bodily along a straight line and having three angularly spaced support points thereon, and three linkage trains each extending between a respective one of said connection points and a respective one of said support points for moving each of said support points in response to movement of the corresponding connection point.

11. The combination defined in claim 10 further characterized by said three support points on said nonrotatable azimuth member being uniformly spaced about and from said center point, and said three connection points being uniformly spaced about and from a point on said first axis.

References Cited by the Examiner

UNITED STATES PATENTS

| | | | |
|---|---|---|---|
| 2,473,331 | 6/1949 | Donley | 170—160.25 |
| 2,599,690 | 6/1952 | Buivid | 170—160.25 |
| 2,670,804 | 3/1954 | Campbell | 170—160.25 |
| 2,957,527 | 10/1960 | Gerstenberger | 170—160.25 |
| 3,077,934 | 2/1963 | Hartswick | 170—160.25 |
| 3,109,496 | 11/1963 | Ellis et al. | 170—160.25 |

FOREIGN PATENTS

| | | |
|---|---|---|
| 1,213,762 | 11/1959 | France. |
| 698,712 | 10/1953 | Great Britain. |

JULIUS E. WEST, *Primary Examiner.*

ABRAM BLUM, *Examiner.*